(12) United States Patent
Fini et al.

(10) Patent No.: US 8,923,678 B2
(45) Date of Patent: Dec. 30, 2014

(54) TECHNIQUES FOR MANIPULATING CROSSTALK IN MULTICORE FIBERS

(75) Inventors: John Michael Fini, Metuchen, NJ (US); Thierry Franck Taunay, Bridgewater, NJ (US); Man F. Yan, Berkeley Heights, NJ (US); Benyuan Zhu, Princeton, NJ (US)

(73) Assignee: OFS Fitel, LLC, Norcross, GA (US)

( * ) Notice: Subject to any disclaimer, the term of this patent is extended or adjusted under 35 U.S.C. 154(b) by 707 days.

(21) Appl. No.: 12/959,184

(22) Filed: Dec. 2, 2010

(65) Prior Publication Data

US 2011/0129190 A1   Jun. 2, 2011

Related U.S. Application Data

(60) Provisional application No. 61/265,997, filed on Dec. 2, 2009, provisional application No. 61/311,177, filed on Mar. 5, 2010, provisional application No. 61/314,165, filed on Mar. 16, 2010, provisional application No. 61/392,472, filed on Oct. 12, 2010.

(51) Int. Cl.
  *G02B 6/36* (2006.01)
  *G02B 6/02* (2006.01)
  *G02B 6/44* (2006.01)

(52) U.S. Cl.
  CPC .......... *G02B 6/02042* (2013.01); *G02B 6/4403* (2013.01)
  USPC ....................................... 385/126

(58) Field of Classification Search
  USPC ....................................... 385/126
  See application file for complete search history.

(56) References Cited

U.S. PATENT DOCUMENTS

| 5,704,960 | A  | * | 1/1998 | Evans et al. ................ 65/402 |
| 6,389,187 | B1 | * | 5/2002 | Greenaway et al. ........... 385/13 |
| 6,993,229 | B2 | * | 1/2006 | Chen et al. ................ 385/123 |
| 7,324,714 | B1 | * | 1/2008 | Cranch et al. ............... 385/12 |

(Continued)

FOREIGN PATENT DOCUMENTS

| JP | 2011170336 A | 9/2011 |
| JP | 2011197661 A | 10/2011 |
| WO | WO2012029721 A1 | 3/2012 |

OTHER PUBLICATIONS

Fini, John M.; Zhu, Benyuan; Taunay, Thierry F.; and Yan, Man F., "Statistics of Crosstalk in Bent Multicore Fibers," Optics Express, vol. 18, No. 14, pp. 15122-15129 (2010).

(Continued)

*Primary Examiner* — Uyen Chau N Le
*Assistant Examiner* — Hoang Tran
(74) *Attorney, Agent, or Firm* — Jacobs & Kim LLP (57) ABSTRACT

A multicore optical fiber includes a plurality of core regions disposed within a common cladding region. Each of the plurality of core regions is configured, in combination with the common cladding region, to propagate light along a longitudinal axis of the fiber. At least two core regions are configured to inhibit resonant coupling of propagated light therebetween within a selected region of operation. At least one segment of the fiber includes a twist that is configured such that when the twisted segment is subjected to a bend having a selected radius, the twist creates a controlled change in the amount of crosstalk between the at least two core regions, compared with the amount of crosstalk between the at least two core regions when a bend having the selected radius is introduced into a non-twisted segment of the fiber.

8 Claims, 9 Drawing Sheets

(56) References Cited

U.S. PATENT DOCUMENTS

2004/0165178 A1 8/2004 Clements
2006/0140560 A1 6/2006 Allen et al.
2007/0065077 A1 3/2007 Childers et al.

OTHER PUBLICATIONS

Koshiba, M.; Saitoh, K.; and Kokubun, Y., "Heterogeneous Multi-Core fibers: Proposal and Design Principle," IEICE Electron. Exp., vol. 6, No. 2, pp. 98-103 (2009).

* cited by examiner

TECHNIQUES FOR MANIPULATING CROSSTALK IN MULTICORE FIBERS

CROSS REFERENCE TO RELATED APPLICATIONS

The present application claims the priority benefit of the following United States provisional patent applications, which are all owned by the assignee of the present application: U.S. Provisional Patent Application Ser. No. 61/265,997, filed on Dec. 2, 2009; United. States Provisional Patent Application Ser. No. 61/311,177, filed on Mar. 5, 2010; U.S. Provisional Patent Application Ser. No. 61/314,165, filed on Mar. 16, 2010; and U.S. Provisional Patent Application Ser. No. 61/392,472, filed on Oct. 12, 2010. These applications are all incorporated herein by reference in their entirety.

BACKGROUND OF THE INVENTION

1. Field of the Invention

The present invention relates generally to optical fiber devices and methods, and in particular to improved techniques for reducing crosstalk in multicore fiber transmissions.

2. Background Art

Multicore fibers have been proposed as a way of scaling the capacity beyond the limits of single-core fibers. This type of innovation is significant, because current demand is driving systems towards fundamental limits, even assuming advanced modulation formats. In addition, multicore fibers are being researched for diverse applications where they offer improvements in cost, compactness, and the like.

Crosstalk is a potential disadvantage of multi-core relative to multi-fiber solutions. A requirement of low total crosstalk tends to put a limit on the density of cores, and thus the capacity scaling, as well as having an impact on the amount of signal processing and conditioning necessary to recover transmitted information. Design principles for achieving low crosstalk with low nonlinearity and/or loss are thus of great interest.

SUMMARY OF THE INVENTION

A multicore optical fiber comprises a plurality of core regions disposed within a common cladding region. Each of the plurality of core regions comprises a respective waveguide for propagating light along a longitudinal axis of the fiber. At least two core regions are configured to inhibit resonant coupling of propagated light therebetween within a selected region of operation. At least one segment of the fiber includes a twist that is configured such that when the twisted segment is subjected to a bend having a selected radius, the twist creates a controlled change in the amount of crosstalk between the at least two core regions, compared with the amount of crosstalk between the at least two core regions when a bend having the selected radius is introduced into a non-twisted segment of the fiber.

DETAILED DESCRIPTION

Aspects of the present invention provide techniques for reducing crosstalk in a multi-core fiber (MCF) design. As discussed below, the described techniques and fibers result from the understanding that crosstalk in an MCF occurs, in significant part, because of resonant coupling between individual cores in the MCF. Thus understood, it is possible to properly analyze how bends in an MCF fiber contribute to crosstalk, and how twists in the fiber can be used in conjunction with bends to control the overall amount of crosstalk.

The following discussion is divided into the following sections:

1. Introduction—Exemplary MCF and Overview of Techniques
2. Coupled-Model Model
3. Skewed-Core Fiber Designs
4. Spinning of Multicore Fiber
5. Reduction of Crosstalk in Multicore Fibers
6. Variable Spin Rates
7. Bend-Induced Phase Matching
8. Analytical Approach
9. Results for Stationary Random-Bend Processes
10. General Technique
11. Applicability of Described Techniques to Single-Mode Cores, Multimode Cores or a Combination Thereof
12. Conclusion 1. Introduction—Exemplary Mcf And Overview Of Techniques The present techniques are described with respect to a 7-core MCF design, of the type described in U.S. Provisional Patent Application Ser. No. 61/314,184, filed on Mar. 16, 2010, owned by the assignee of the present application and incorporated herein by reference in its entirety. However, it will be appreciated that the described techniques are applicable in other contexts, with other types of multicore fibers having different numbers of cores, different core and cladding structures, different core configurations, and the like.

Figure 1:
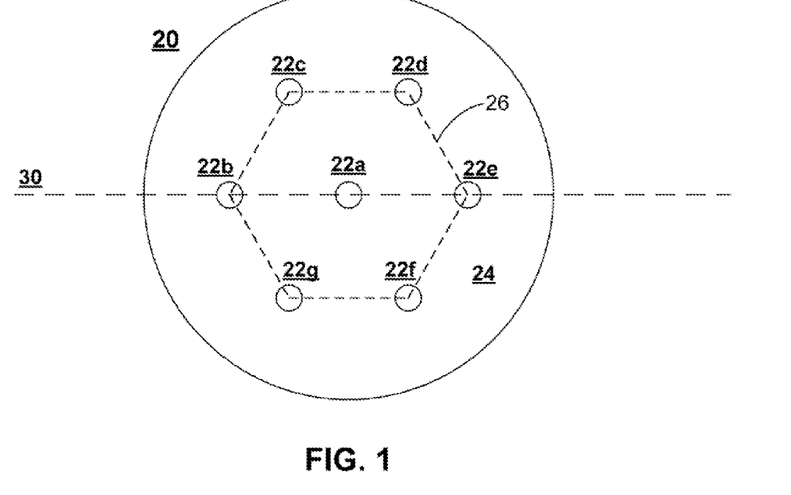
FIGS. 1 and 2 show, respectively, cross section and isometric views of an exemplary multicore fiber suitable for use with the described practices of the invention.
Figure 2:
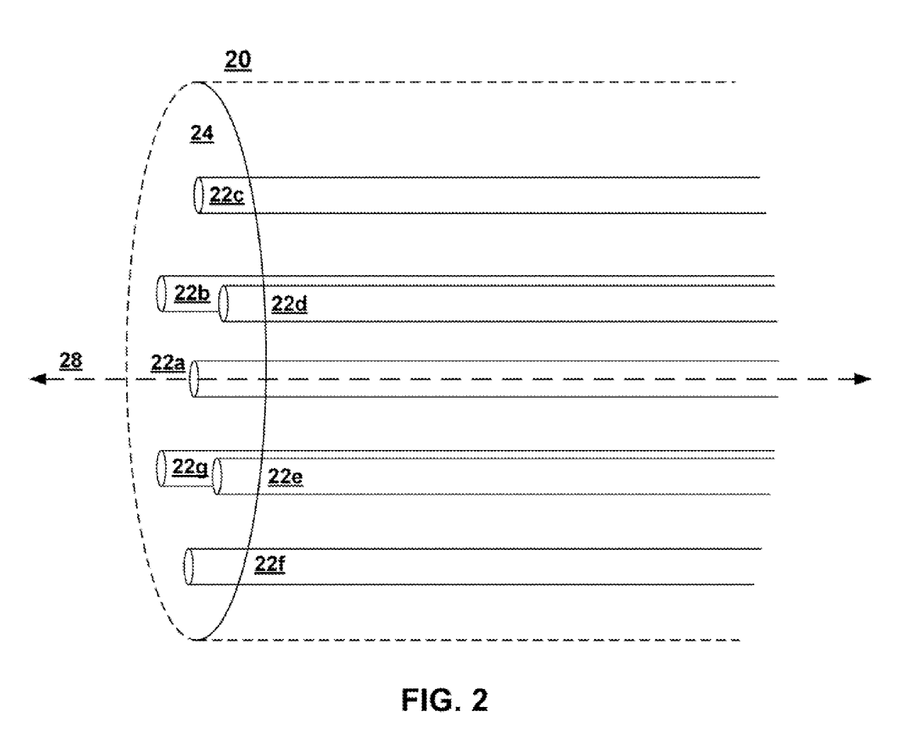

FIGS. 1 and 2 show, respectively, cross section and isometric diagrams of an exemplary 7-core MCF 20, comprising an array of seven core regions 22*a-g* within a common cladding region 24. A first core region 22*a* is located at the center of the fiber. Six of the core regions 22b-g are arranged as a hexagon 26 surrounding central core 22a. The seven core regions 22a-g are configured to carry respective light transmissions down the length of MCF 20 along a longitudinal axis 28 thereof.

Figure 3A:
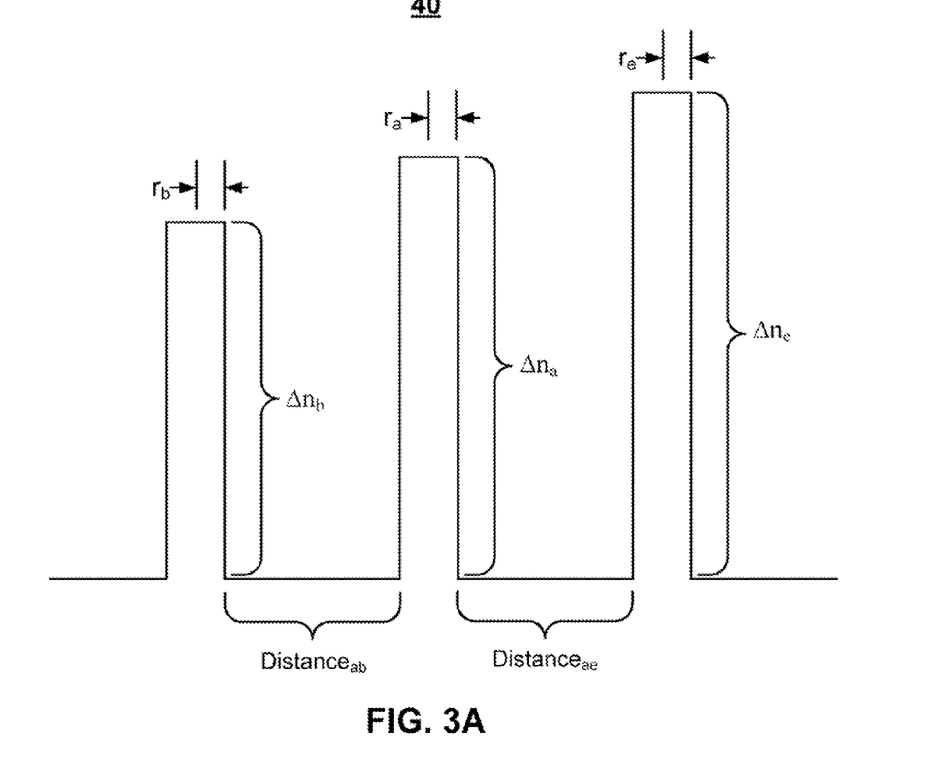
FIG. 3A shows an exemplary refractive index profile for the fiber shown in FIGS. 1 and 2 across diameter D.

FIG. 3A shows an exemplary refractive index profile 40 across MCF diameter 30. The refractive index profile 40 illustrates the respective refractive index differences $\Delta n_b$, $\Delta n_a$, $\Delta n_e$, for core regions 22b, 22a, and 22e. In FIG. 3, for the purposes of illustration, it is assumed that each core of MCF 20 has a step refractive index profile.

Each radius of core regions 22b, 22a, and 22e is represented by a corresponding distance $r_b$, $r_a$ and $r_e$ along the horizontal axis of the refractive index profile 40. The refractive index of each core region is represented in the refractive index profile by vertical distance. For the purposes of discussion, the respective refractive index of each of the core regions of fiber 20 is described using its respective "refractive index difference" $\Delta n_b$, $\Delta n_a$, $\Delta n_e$, i.e., the difference in refractive index between that of the fiber region and that of the fiber's common cladding region 24.

While a step index profile is shown, it is understood that more complex refractive index profiles may be employed, such as a depressed clad design, a trench design, segmented cores, and the like. In such cases, the parameter $\Delta n_i$ may be used to refer to the equivalent step index of the core, a usage well known in the art.

The respective refractive index differences of the seven core regions 22a-g are configured, in combination with the refractive index of common cladding region 24, to create respective waveguides down the length of MCF 20. The respective "effective mode index" of each waveguide is a numerical quantity, indicating phase delay per unit length of the fundamental mode of that waveguide for a given wavelength transmission. The effective mode index of a given waveguide is a function of the wavelength of transmission and the effective refractive index profile of the core. Resonant coupling between two waveguides occurs when the respective effective mode indices of two core regions are sufficiently close to each other, such that there is phase-matching and constructive interference between their respective light transmissions.

Assuming for the moment that bends and twists in an MCF are not to be taken into account, it is possible to configure the MCF core regions to substantially reduce or eliminate crosstalk. In particular, it is possible to configure the core regions and the resulting waveguides to have respective effective mode indices that are sufficiently different in a given fiber region of interest, such that there occurs a phase mismatch that substantially reduces or eliminates resonant coupling and crosstalk. Previous methods have attempted such configurations.

Figure 3B:
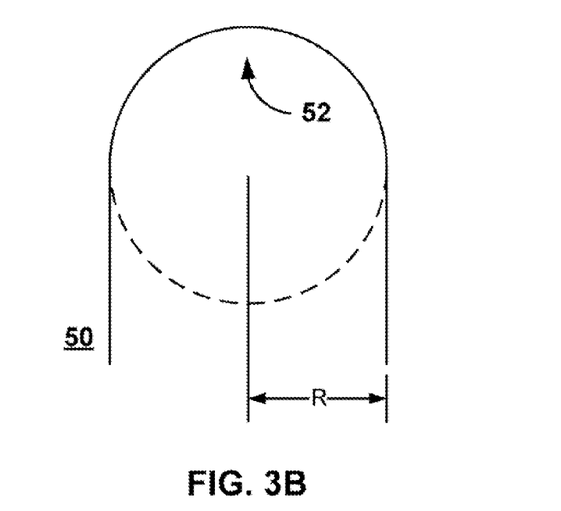
FIG. 3B is a diagram illustrating an exemplary bend in the fiber shown in FIGS. 1 and 2.

However, bends in an MCF have a significant effect on crosstalk. FIG. 3B is a diagram illustrating an optical fiber 50, such as fiber 20 shown in FIG. 1, in which a bend 52 is introduced having a radius R. Bend statistics can be generated for a given fiber, for example, by winding the fiber around a spool having a known radius and bending profile.

As set forth in greater detail below, a bend in the fiber, even one with a relatively large radius, can cause a significant shift in the respective effective mode indices of the waveguides within the bent segment. This shift in the effective mode indices can in turn lead to phase-matching, resonant coupling, and crosstalk.

According to an aspect of the invention, described below, crosstalk is reduced in an MCF containing one or more bends by introducing a suitably configured twist into the bent segments of the fiber. For example, one way to introduce a suitable twist is through the use of a spinning technique, in which the fiber or fiber preform is rotated during draw using a suitable spin profile.

Figure 4:
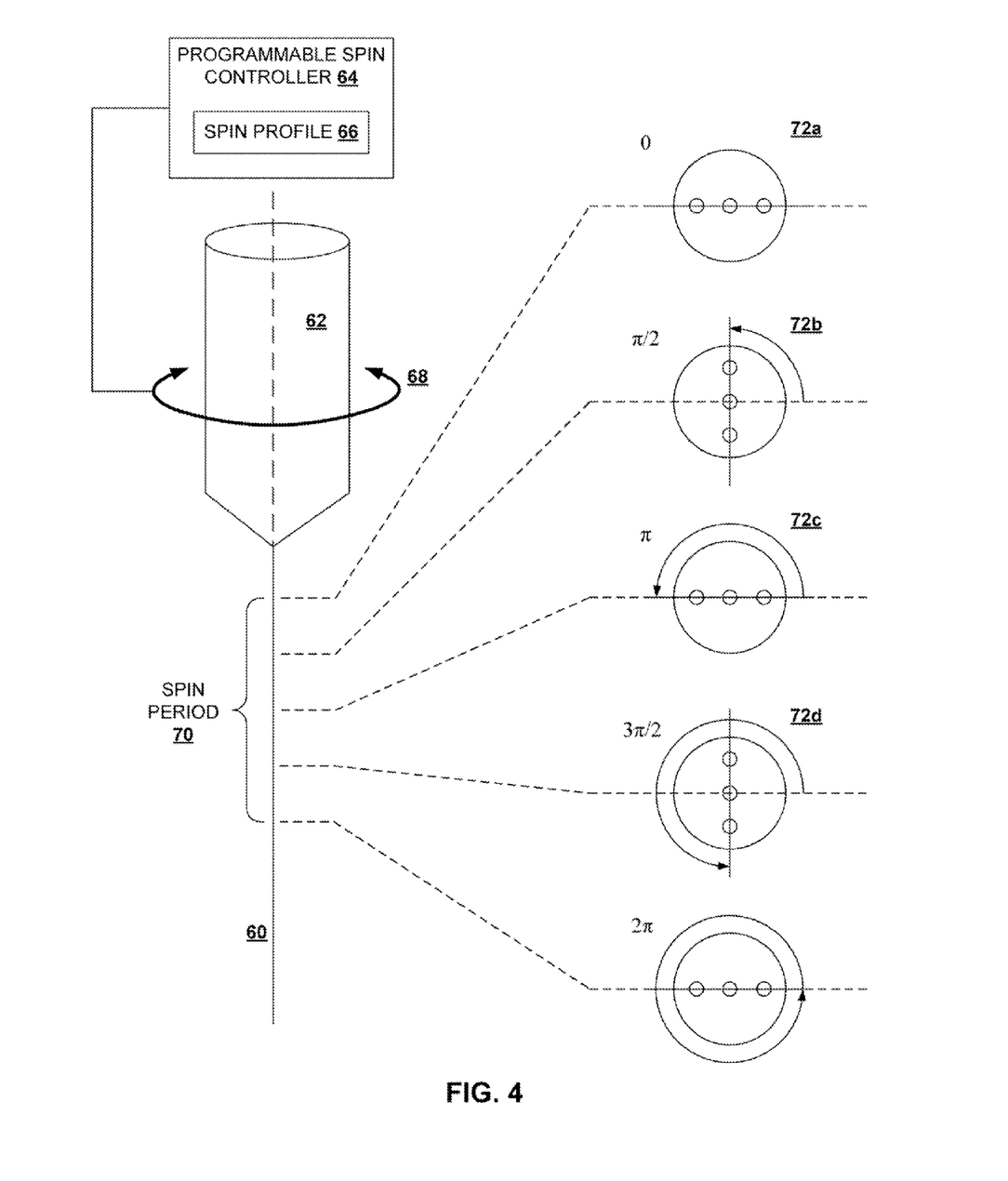
FIG. 4 is a diagram illustrating a technique for applying a selected spin profile to an optical fiber.

FIG. 4 is a diagram illustrating how a desired twist profile may be introduced into a given fiber 60 by spinning the preform 62 as the fiber is dawn. A programmable spin controller 64 applies a user-entered spin profile 66 to the preform 62. The preform 62 is rotated around its longitudinal axis, causing a controllable amount of twist 68 to be introduced into the fiber 60. This twist 68 can be quantified, for example, as an angle of rotation (measured in radians) occurring over a given length of fiber, i.e. the spin period 70. The fiber cross sections 72a-e at the right of FIG. 4 illustrate a constant-rate twist in the same direction for a full $2\pi$ radians, i.e., 360°. However, a spin profile can be used in which the rate of rotation is variable, and in which the direction of rotation changes. Alternatively, the controller 64 can apply the rotation to the end of fiber 60 while keeping the preform 62 at a fixed orientation. Further, twist may be imparted using a passive apparatus in which twist is induced using a canted wheel assembly in contact with the fiber, as is well known in the art.

As discussed in greater detail below, given an MCF design with approximately fixed modefield diameters and core spaces, it is possible to apply one or more of the following strategies, which may be applied independently of modefield diameter and core diameter:

1. Introduce a twist into the fiber that reduces crosstalk in the anticipated region of operation. The spin can alternate direction and/or vary along the fiber length to impart of randomness. Alternatively, the spin can be held constant within a selected tolerance, to achieve desired effects, such as maintaining close to a fixed geometrical alignment between cores.

2. Fabricate dissimilar cores and place them so that nearby cores have modes with effective indices different enough to reduce coupling in the anticipated region of operation, even when bends and other perturbations are present.

3. Constrain the bends and twists by mechanical design of the fiber or cable. For example, a noncircular fiber (such as a rectangular or D-shaped outer surface) can have preferred orientations for bending. The placement of the cores can be determined based on the bending and twisting nature of the fiber or cable. Similar effects can be achieved in a cable design which exhibits preferred orientations. For example, two stiff members on opposite sides of the centerline will restrict bending in a plane perpendicular to the plane of the members.

4. Fabricate fibers or cables so that layout in an undesirable region of bend, spin, or twist parameters can be easily detected and avoided through either fiber and cable design considerations mentioned above.

5. Fabricate fibers or cables such that the bend is predominantly along a certain direction and modify the core spacing, index profile, or index matching along that direction to reduce the crosstalk between cores that are nearby and where separation between these cores is primarily along the direction of the bend.

It should be noted that this list is provided for illustrative purposes and for the sake of the present discussion. It will be appreciated that aspect of the present invention may be applied in other contexts and using structures other than those specifically listed below.

Figure 5A:
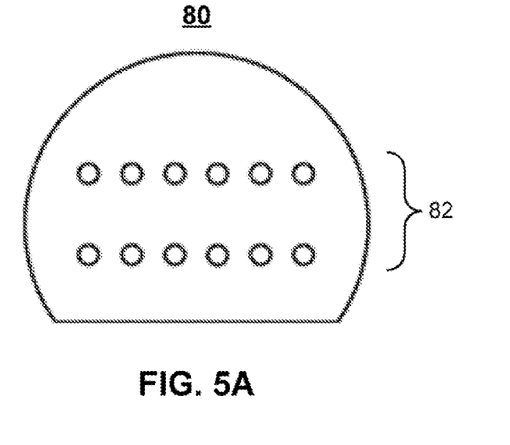
FIG. 5A is a cross section view a D-shaped multicore fiber according to a further aspect of the invention.
Figure 5B:
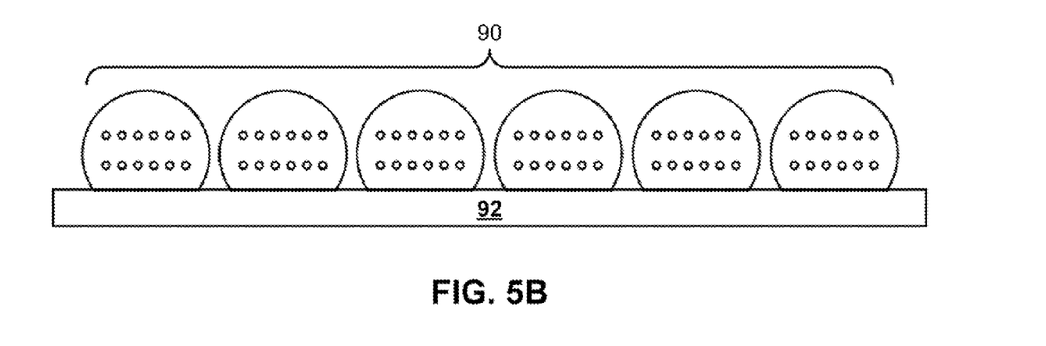
FIG. 5B is a cross section view of an array of D-shaped multicore fibers and a stiff cable element used to constrain the respective bending orientations of the fibers.

FIG. 5A and FIG. 5B illustrate how a combination of items 3 and 5 in the above list could be implemented, i.e., providing a larger core spacing in the anticipated direction of bend, as determined by a stiff cable element. FIG. 5A shows a cross section of a D-shaped multicore fiber 80 having 12 cores 82 arranged in a rectangular array. One or more D-shaped fibers can be attached to a stiff cable element, which constrains the orientation of bends, as set forth above in item 3. FIG. 5B shows a configuration in which an array of six D-shaped fibers 90 are arranged side-by-side on stiff cable element 92. Since the direction of bends is constrained, the spacing of cores within each multicore fiber along the direction of bend can be configured to be different from the spacing in the orthogonal direction. These spacings can be chosen using considerations of the bend impact on crosstalk, in accordance with item 5.

As mentioned above, the theoretical models presented herein are based on the realization that crosstalk coupling is dictated by resonant coupling and that such coupling is controlled by a number of parameters, including: effective mode index, the spacing between waveguides, and the geometry of the arrangement, e.g., bending, twist, and axial strain. This understanding leads to a wide design space for inhibiting resonant coupling. These parameters can be controlled during the fiber design and fabrication process, for example, by controlling core properties and spacing, or by spinning the fiber during draw, or by appropriately designing the shape of the fiber.

Desired fiber characteristics can also be imparted after fiber draw using cable structures to control the orientation of the fiber. For example, the fiber can wind helically around a cable member to create a fiber twist, which may be constant or variable along the cable length. Periodic or aperiodic bending can also be induced using cable design.

In some applications, it may be desirable to intentionally induce coupling. For example, in some systems, it may be desirable to randomly mix the light among the cores. In such an application, it may be desirable to do this as efficiently as possible.

Given the above-described understanding and the below discussion, it is possible to identify fiber and cable regimes to meet certain properties of high-bandwidth communications paths. These may differ depending on the nature of the communications technology. For example, if the system requires a randomized signal, this can be accomplished using designs which "scramble" the light among cores. Alternatively, technology which requires low levels of crosstalk will require different fiber and cable designs. In other applications, there may be an optimal amount of crosstalk desired. This may be useful for detecting changes in the system which, for example, could be accomplished by making one pair of cores well-coupled, while the others are less well-coupled.

Resonant coupling between modes of two cores occurs when the effective index of these modes is the same, to within a tolerance proportional to the strength of coupling. The effective index for each mode is shifted by differences between the as-fabricated cores, and also by length-varying or layout-dependent factors, such as bending. The mathematical description of bend-induced shift in effective index difference between two cores is given below in Section 2.

If the fiber has any appreciable twist, then the orientation of the bend relative to the fiber cross section is rotating along the fiber length. A twist can introduce a shift due to a path-length-adjustment for helical waveguides; its more important role, generally, will be to modulate the bend-induced index shift. Strategy No. 2 listed above can then be implemented if, for example, nearest-neighbor cores are nearly identical, but perturbed to have as-fabricated effective-index differences, called index skew.

To make an array of cores following the restriction that nearby cores would have, at least, a prescribed mode index mismatch, one can produce several groups of cores so that all cores in a group have nearly the same as-fabricated effective index, and arrange the cores so that no two cores in a group are closer than some prescribed distance. Simple examples include, for example, a checkerboard pattern. These can be generalized to mitigate coupling with secondary neighbors or to allow for different degrees of coupling seen by cores depending upon their placement relative to the bend orientation.

In simulations, it has been found that cross-coupling can be significantly reduced in some applications if the twist rate is selected in an appropriate range, even if the as-fabricated cores have random variations and no systematic skew in resonance for nearby cores.

In simulations of a seven-core fiber with triangular spacing of cores, it has also been shown that by skewing the as-fabricated effective index values of nearest-neighbors, using 3 groups, it is possible to achieve significant reduction in crosstalk, but only if bends are properly taken into account in determining the level of skew.

2. Coupled-Mode Model

According to a first aspect of the invention, fiber spin control is used to significantly reduce crosstalk by varying the orientation of the Cores with respect to fiber bends. This aspect of the invention can be understood with reference to the following coupled-mode model.

If the individual cores of a multi-core fiber are single-mode, then propagation can be understood with a simple coupled-mode propagation model:

$$\frac{d}{dz}u = \frac{i2\pi}{\lambda}(D+C)u \quad (2.1)$$

where u is a vector of amplitudes for the local modes;
z is the axial length;
$\lambda$ is wavelength;
C is a matrix of coupling coefficients (in index units); and
D is a diagonal matrix of effective mode index values for the single mode cores.

For a regular geometry, C has approximately equal nearest-neighbor elements ($C_{mn}$-$c_0$), with all other elements nearly zero. If the fiber is bent with radius $R_{bend}$ and orientation $\theta$, then it is known that the effective index is shifted, and so for core m at position $x_m$, $y_m$, with effective mode index $\Delta n_m^{eff}$:

$$D_{m,n} = \Delta n_m^{eff} + \frac{\gamma n_{core}}{R_{bend}}(x_m \cos\theta + y_m \sin\theta) \quad (2.2)$$

In the absence of stress corrections, $\gamma=1$.

Since previous analyses have neglected bends, the present discussion begins with a rough approximation of the different terms.

Consider, for example, a step-index fiber with $\Delta=0.0031$, nominal core diameter 10.4 μm, and spacing a=42 μm. Then, at 1550 nm, $c_0 \approx 4.6 \times 10^{-9}$ (in effective index units). Accidental and intentional variations between the cores will likely fall in the range $10^{-5}$ to $10^{-3}$. Bend perturbations are on the order of $a/R_{bend}$, and can be comparable to or much larger than core variations, even for bend radii on the order of a meter. Further, bend perturbations are typically much larger than $c_o$ unless the fiber is held extremely straight, $R_{bend} > 1$ km. Direct simulation of Eq. (2.1) over short fiber lengths brings out the impact of bending, and can be used to derive the statistical propagation parameters for longer lengths relevant to telecommunications links.

3. Skewed Core Fiber Designs

Figure 6:
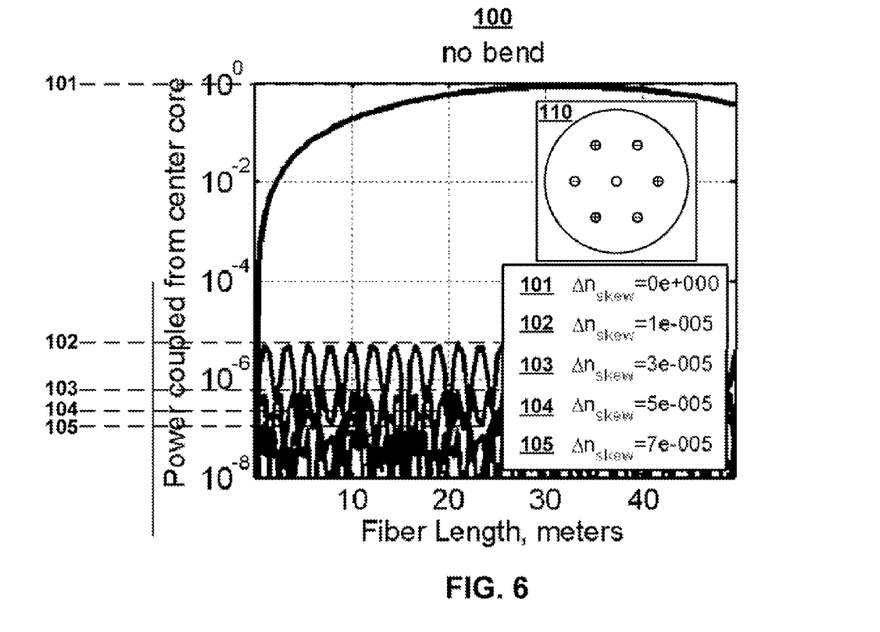
FIG. 6 is a graph of a simulation illustrating the effect of skew on crosstalk in a multicore fiber, in the absence of fiber bends.

Bend perturbations and realistic fabrication, strain, and temperature variations are crucial in the design of low-crosstalk fibers, for example, with intentionally skewed effective indices of nearest-neighbor cores. Previous analyses neglecting these factors lead to results such as those shown in FIG. 6, which shows a graph 100 of a simulation using a transfer-matrix propagation of Eq. 2.1 for an exemplary 7-core fiber of the type discussed above, a cross section of which is shown in inset 110. The outer six cores have $\Delta n_m^{\text{eff}} = \pm \Delta n_{skew}$ such that nearest-neighbors are skewed by at least $\Delta n_{skew}$. Broken line 101 indicates a peak crosstalk value (normalized to $1 \times 10^0$), occurring at a length of approximately 30 meters. Broken lines 102, 103, 104, and 105 indicate respective peak crosstalk values at effective index skews ranging from $1 \times 10^{-5}$ to $7 \times 10^{-5}$. Even these very small skews reduce crosstalk by a significant amount.

Skewing the effective mode index of cores prevents phase-matched coupling between them. However, if the bend perturbation is large enough, it can bring skewed cores into phase-matched resonance. If this occurs, the effect is to remove much of the benefit of the skew strategy, unless the skew is significantly larger than $\gamma n_{core} a / R_{bend}$. This is shown, for example in the graph 120 shown in FIG. 7, for the case that effective index of each core is as designed, i.e., without intentional twists or other adjustments. Trace 121 indicates the crosstalk in an unskewed MCF. Traces 122, 123, 124, and 125 indicate crosstalk values at effective index skews ranging from $1 \times 10^{-5}$ to $7 \times 10^{-5}$.

Figure 7:
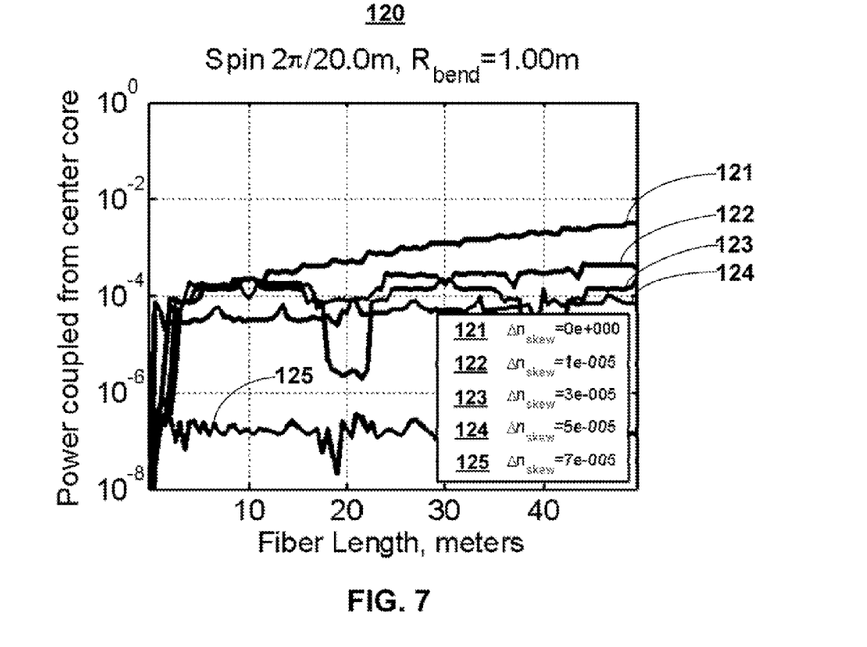
FIG. 7 is a graph of a simulation illustrating the fiber bends on the simulation shown in FIG. 6.

Since the bend-perturbation depends on the orientation of the bend θ with respect to the core geometry, and since this orientation typically cannot be held constant along the length, phase-matched resonances will be associated with certain positions where $D_{m,m}(\theta(z)) = D_{m',m}(\theta(z))$. In FIG. 7, it is assumed that the fiber orientation drifts very slowly, making a full twist every 20 m. Such a slow drift may be representative of an unintentional twist introduced during draw, cabling, and the like. Discrete jumps corresponding to phase-matching events are discernable in FIG. 7, and can be more pronounced in some applications.

4. Spinning Of Multicore Fiber

According to an aspect of the invention, fiber spinning is used to reduce crosstalk. As mentioned above, fiber spinning is a manufacturing technique in which a twist is introduced into a fiber as it is drawn by rotating the fiber or fiber preform according to a selected or desired spin profile.

As used in the present discussion, the terms "spin" and "twist" are generally used interchangeably, since they similarly describe a change in the orientation of the fiber cross section with respect to a bend. It is recognized that there is a distinction between the terms, to indicate that there is more (twist) or less (spin) strain in the fiber, or the temperature at which the change in orientation is imparted.

Fiber spin has been used to improve polarization performance in a single-core fiber. However, it is believed that heretofore fiber spin has not been applied in the significantly different context of crosstalk reduction.

Figure 8:
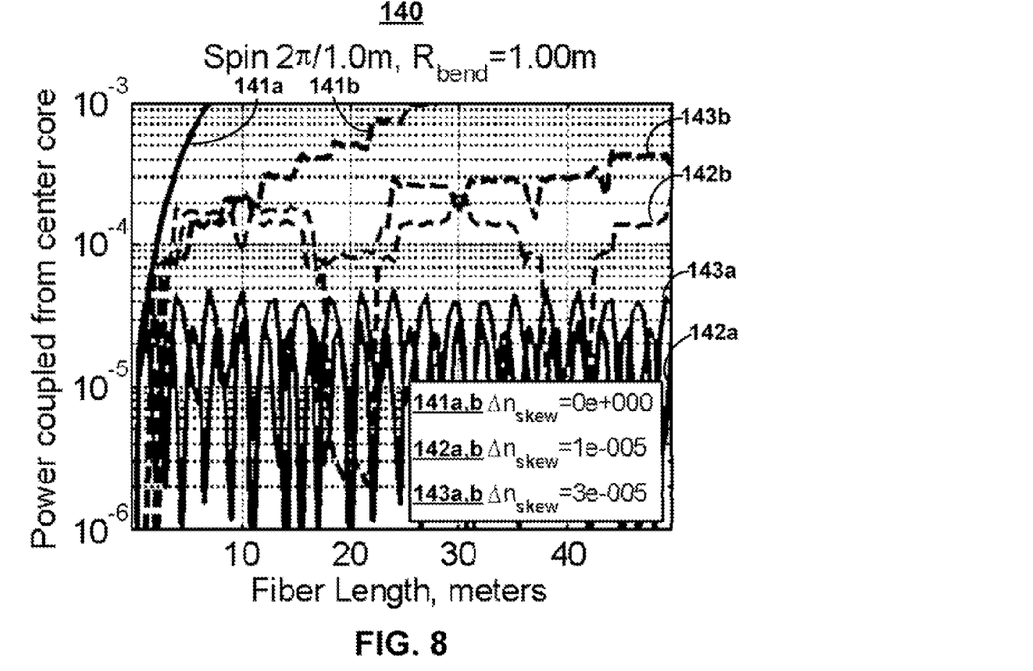
FIG. 8 is a graph of a simulation illustrating the effect of a controlled fiber spin on the simulation shown FIG. 7.

FIG. 8 is a graph 140 illustrating that a controlled fiber spin with $d\theta/dz = 2\pi/1$ m significantly reduces crosstalk for some fibers. Dashed traces 141a, 142a, and 143a are repeated from FIG. 7 (traces 121, 122, 123, respectively) and scaled, for the purposes of comparison. Solid traces 141b, 142b, and 143b show the respective amounts of coupling, in a multicore fiber with a controlled fiber spin, with respective skews of $0 \times 10^0$, $1 \times 10^{-5}$, and $3 \times 10^{-5}$. As shown in FIG. 8, the spun fiber with $3 \times 10^{-5}$ skew (trace 143b) has nearly an order-of-magnitude reduction in crosstalk, compared with the non-spun, unskewed fiber (trace 143a).

Figure 9:
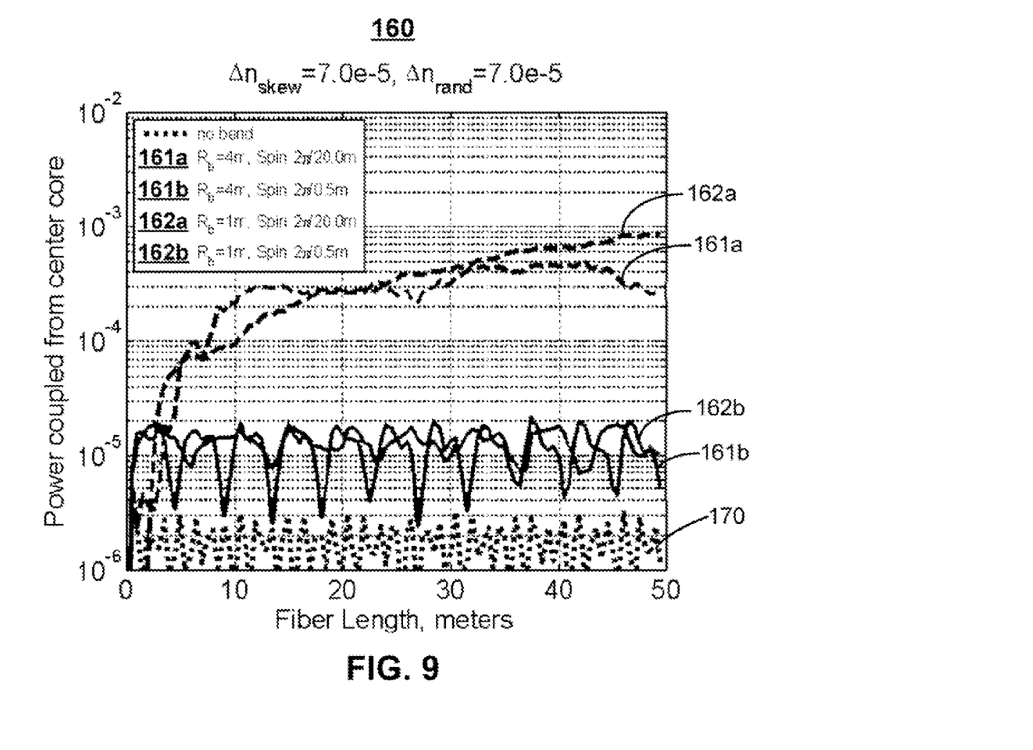
FIG. 9 is a graph of a simulation illustrating the effect of a random effective index component on the simulation shown in FIG. 8.

While fabrication precision varies, unavoidable variation between cores will add a random effective index component $\Delta n_{rand}$ to each core's $D_{m,m}$, likely $>10^{-5}$. Even in the absence of bends, this degrades the impact of skewing the cores unless $\Delta n_{skew}$ is significantly larger than $\Delta n_{rand}$. FIG. 9 thus is a graph 160 that focuses on the largest of the above skews ($7 \times 10^{-5}$), adding a random shift to each outer core uniformly distributed in $7 \times 10^{-5}$. The variation is then just large enough to cancel the skew of an unlucky outer core. In this case, spin is very effective in reducing crosstalk. A 0.5 m spin period (traces 161b and 162b) has crosstalk 1-2 orders of magnitude smaller than for slow orientation drift (161a and 162a). Broken line 170 shows crosstalk values for a fiber without bends, and is provided for comparison. Graph 160 shows that for a real-world situation in which there is either intentional or unavoidable skew in the effective mode indices of core pairs, if the fiber is unbent, then cross-talk can be quite low (line 170). However, such an unbent state is impossible to achieve in a practical cable over a useful length and gradual bends of radius 4 m or even 1 m are unavoidable, in which case crosstalk rises to unacceptable levels (lines 161a, 162a). Twisting of the fiber successfully reduces cross-talk by rotating the cores out of alignment and can achieve improvement by several orders of magnitude (lines 161b, 162b), though cross-talk remains higher than in the "perfect" unbent state. Thus, twisting is very effective in reducing cross-talk in bent multicore fibers which have some level of skew in the effective mode index of the cores. In twisting the fiber, the cores should be rotated out of the orientation for maximum coupling within some fraction of a 4 m bend. Since rotation by $2\pi/10$ is effective in inhibiting cross-talk, twisting should occur at a rate of at least $2\pi/5$ m and preferably around $2\pi/1$ m or greater.

5. Reduction Of Crosstalk In Multicore Fibers

It has been shown above that bends and fabrication variations qualitatively change the crosstalk of a multicore fiber, and are crucial to any realistic crosstalk simulations. By understanding this bend impact, it is possible to design low-crosstalk fibers suited to realistic systems, for example skewing the cores enough to avoid phase-matching when bends and fabrication variation are present. Core spacings can also be adjusted so that they are not all equal. For example, unequal core spacings can used to adjust for variations measured in the individual core rods before assembly of the multicore preform. Further, unequal core spacings can be used together with knowledge of what direction bends tend to fall in for a non-symmetrical fiber or cable.

Spinning of optical fiber has been used in other contexts. In particular, spinning of optical fiber has been used to reduce polarization mode dispersion (PMD): It will be appreciated that, generally speaking, PMD is an impairment that is unrelated to the issue of crosstalk in MCFs. Further, prior analyses of crosstalk in MCFs do not appear to indicate that spinning would have a significant impact.

In particular, discussions of low-crosstalk multicore designs have neglected the impact of bends. Thus, the concept that spin and twist introduce length-variation in an important bend perturbation contradicts prior assumptions of previous experts. Further, generally speaking, the spin functions and parameters used to reduce crosstalk will typically differ from those that would be used to optimize PMD, since these effects stem from different causes. For example, the presently described calculations of crosstalk reduction use spin rates that would likely be too low to be effective for PMD reduction.

Furthermore, while spinning represents a slight perturbation of a core sitting at the fiber centerline, a core offset from the spin axis experiences a much more significant perturbation since it follows a helical trajectory along the fiber. Spinning of a multicore fiber may lead to unwanted effects in the outermost cores if the parameter range is inappropriate. For example, the helical trajectory represents an additional effective bending of the core which can lead to bend-induced loss in addition to the crosstalk effects discussed here. Typical conventional spin rates designed to reduce PMD may be so high that the outermost cores have a short enough local bend radius that loss is unacceptably high. This effect can degrade fiber performance, but it can also be used to suppress modes by reducing the effective cutoff wavelength of the helical core in an otherwise multiple-mode core. In multimode multicore spun fibers, the higher order modes can be suppressed resulting in a high bandwidth at the outermost cores.

In addition to bend loss, the helical trajectory can enhance unwanted coupling of light from the core to the surrounding polymer clad material. Just as bending a conventional single-core fiber with small outer glass diameter can induce unwanted coupling to the polymer coating, spinning a multiple-core fiber can alter such leakage of light out of the fiber. This effect can be sensitive to temperature since both the index of the glass and the polymer change with temperature. Furthermore, at a splice between a spun and unspun fiber, the core trajectory will follow an abrupt change in direction, such as a kink in the core direction. This can lead to higher splice loss.

According to an aspect of the invention, spinning the fiber is used to significantly reduce crosstalk with no sacrifice in nonlinearity, core density, cutoff, etc. This simple study looks at 50-meter lengths with constant spin and bend radius. The statistics of bends as well as temperature variations in actual, installed fiber need to be characterized to allow true fiber optimization.

In some instances, a high degree of crosstalk is desirable so that information launched into one core appears equally in all cores at the exit. Appropriate signal processing can "unscramble" the mixed signals to recover the transmitted information. Since fiber spinning imparts a much greater perturbation on the core phase matching conditions than bending and fabrication variations, it may be necessary to hold fiber spin to very low levels. This may require careful fiber draw to eliminate twist during fiber fabrication, and cable designs and installation methods which similarly do not impart fiber twist. On the other hand, controlled fiber spinning can be used to enhance cross-coupling in the presence of variations in core index, position, bend orientation and even temperature. Spinning is an additional degree of freedom, compatible with changing the design of the core radii, spacing, index etc. At specific axial locations of the spun fiber, controlled bend radius and bend orientation can be introduced to achieve a localized high cross-coupling.

Optimized conditions must be developed for a wide range of fiber installations, from long-haul applications in which signals are transmitted over thousands of kilometers, to more regional applications with distances of hundreds of kilometers, to campus applications of a few kilometers, to local area networks of hundreds of meters, to data center or central office applications requiring tens of meters, to optical amplifier and device applications of a few meters. Conditions for bending, skew and spinning can be altered to produce the desired properties for the particular application.

6. Variable Spin Rates

Figure 10:
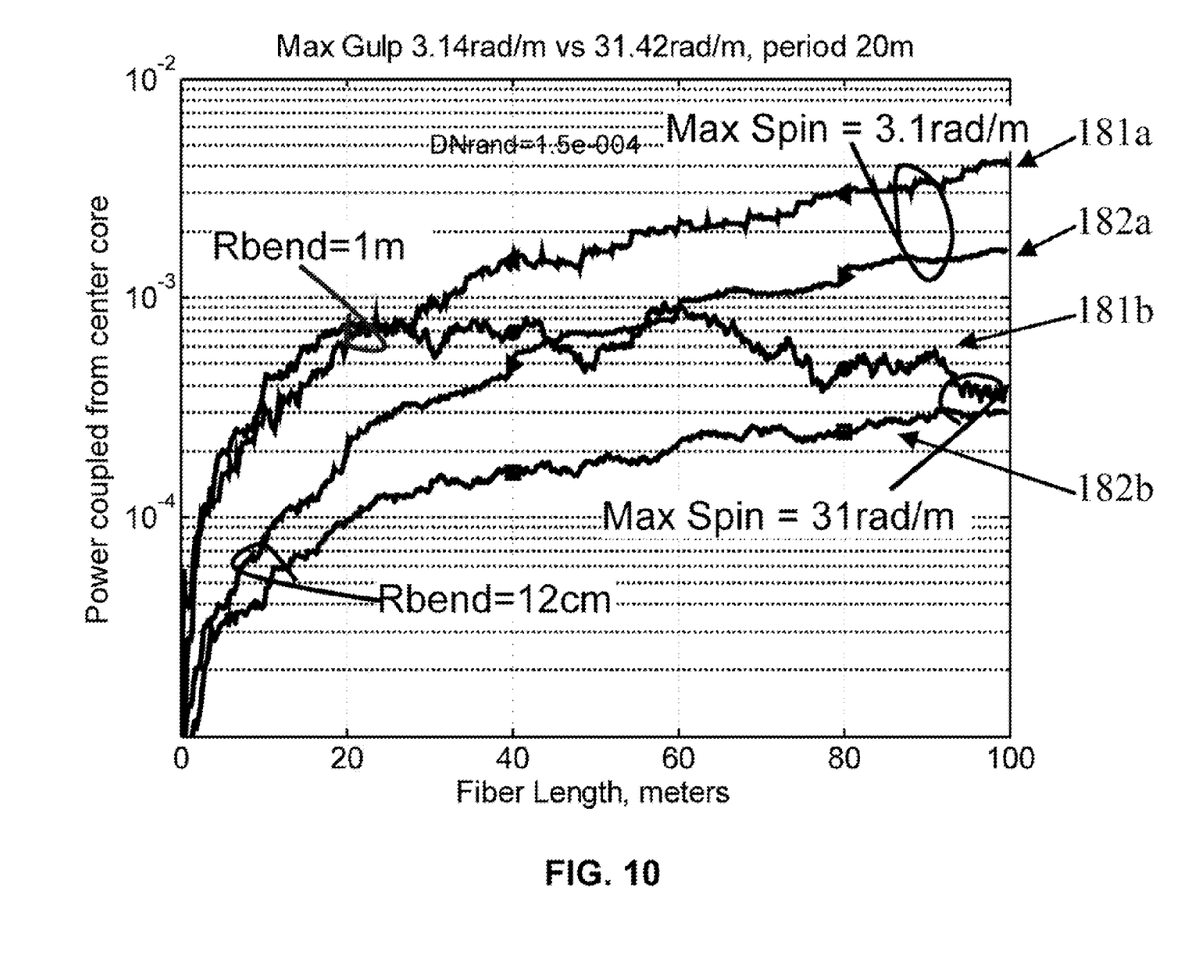
FIG. 10 is a graph of a simulation illustrating the effect of variable spin rates on the simulation shown in FIG. 7.

Simulations have also shown that variable-rate spinning can significantly reduce crosstalk in multicore fibers. Spin rate varied sinusoidally between plus-and-minus a maximum rate. In the FIG. 10 graph 180, two variable spin rates are compared, and significant reduction in crosstalk is achieved with a higher variable spin rate for most bend radii simulated. Traces 181a and 182a show values for a variable spin rate with a maximum rate of 3.14 radians per meter, and traces 181b and 182b show values for a variable spin rate with a maximum rate of 31.42 radians per meter.

7. Bend-Induced Phase Matching

Figure 11:
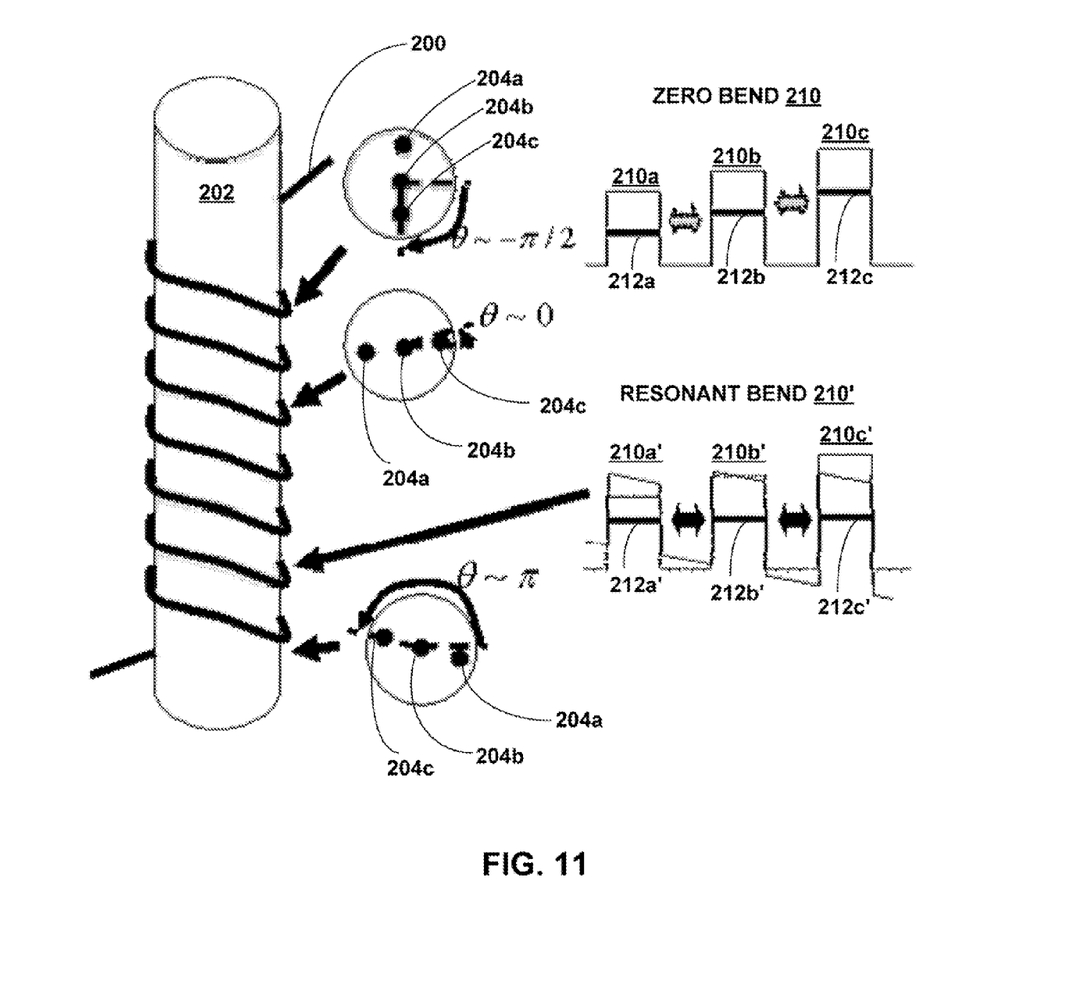
FIG. 11 is a diagram illustrating intermittent phase matching that can occur between two ore more cores as a result of bending.

FIG. 11 is a diagram illustrating the intermittent phase matching that can occur between two or more cores as a result of bending. As the bend orientation wanders, bend perturbations change phase-matching.

If the bend is tight enough, i.e., $R_{bend} < a\gamma n_{skew}/\Delta n_{skew}$, then phase-matched coupling is achieved once or twice per twist period for each pair of neighboring cores.

In FIG. 11, a multicore fiber 200 is subjected to a constant-radius bend by winding it around cylinder 202. Three core regions 204a, 204b, and 204c are depicted for fiber 200. For the purposes of illustration, it is assumed that fiber 200 includes a twisted region, in which outer cores 204a and 204c wind around center core 204b in a generally helical configuration, while substantially maintaining the distance therebetween.

The twist in multicore fiber 200 causes a periodic change in the bending orientation of cores 204a, 204b, and 204c. As shown in FIG. 11, as the twist angle of cores 204a, 204b, and 204c increases from $\theta \approx \pi/2$ to $\theta \approx 0$, and then to $\theta \approx \pi$, there is a shift in the respective effective mode indices of the core regions. In particular, there is a shift between a zero bend profile 210 and a resonant bend profile 210', in which the respective indices 210a, 210b, and 210c for cores 204a, 204b, and 204c are shifted to new indices 210a', 210b', and 210c'. In the zero bend profile 210, phase mismatch is indicated by the non-alignment of effective mode index bars 212a, 212b, and 212c. In the resonant bend profile 210', the shifting of the index profiles has caused effective mode index bars 212a', 212b', and 212c' to move into alignment, indicating a phase matching resulting in crosstalk.

8. Analytical Approach

It is useful to think of the coupled-mode propagation as having three parts:

$$\frac{d}{dz}u = \frac{i2\pi}{\lambda}(A+B+C)u$$

Coupling is given by C, bend perturbations by B, and the unperturbed mode effective index, including manufacturing variation, etc., is given by A. These have very different properties generally:

A is diagonal, slowly varying (>≈100 m), with index differences on the order of ~$10^{-5}$ to ~$10^{-4}$ in the case of unintentional variation, or up to ~$10^{-3}$ in the case of intentional skew.

B is diagonal, quickly varying, with index differences ~$\gamma n_{core} a/R_{bend}$, and can range from ~$10^{-6}$ to ~$10^{-3}$.

C is non-diagonal, slowly varying (>~100 m) with magnitude typically <<$10^{-6}$.

Further, while index differences in A may have some variation on shorter lengths, they will remain highly correlated for long lengths corresponding to splice intervals.

If it is possible to obtain analytical or statistical results for the transfer matrix $U(z_2,z_1)$ over short fiber segments, then a long-distance model can be expressed as a concatenation of these short-segment matrices:

$$U(L,0) = U(L,z_{N-1}) \ldots U(z_2,z_1)U(z_1,0)$$

Individual matrices $U(z_{p+1},z_p)$ can be approximately uncorrelated in the statistics of B, even though A has very long-range correlations. Thus in a concatenation model, individual matrices $U(z_{p+1},z_p)$ can represented by a statistical average over B, so that the concatenation is manageable.

Since C is small and A+B is diagonal, and thus integrable, a natural approach is $$\frac{d}{dz}P = \frac{i2\pi}{\lambda}(A+B)P$$

$$u = P\tilde{u}$$

$$\frac{d}{dz}\tilde{u} = \frac{i2\pi}{\lambda}P^{-1}CP\tilde{u}$$

If A is approximately constant over the interval z in $[z_1,z_2]$, $$P(z) = \exp\left(\frac{i2\pi}{\lambda}A(z-z_1)\right)\exp\left(\int_{z_1}^{z}\frac{i2\pi}{\lambda}B\right)P(z_1)$$

If the interval is small enough to neglect higher-order terms, the transfer matrix $U(z_2,z_1)$ is $$U(z_2,z_1) \approx 1 + \int_{z_1}^{z_2} dz \frac{i2\pi}{\lambda}P^{-1}CP$$

$$U_{n,m}(z_2,z_1) \approx \delta_{n,m} + \frac{i2\pi}{\lambda}C_{nm}\int_{z_1}^{z_2} dz P_{n,n}^{-1}P_{m,m}$$

The crosstalk induced over this interval is $|U_{nm}|^2$ for unequal n and m, $$|U_{n,m}|^2 \approx \left|\frac{2\pi C_{nm}}{\lambda}\right|^2 \int_{z_1}^{z_2} dz \int_{z_1}^{z_2} dz' (P_{n,n}^{-1}(z)P_{m,m}(z))^* P_{n,n}^{-1}(z')P_{m,m}(z'),$$

$$n \neq m$$

$$|U_{n,m}|^2 \approx \left|\frac{2\pi C_{nm}}{\lambda}\right|^2 \int_{z_1}^{z_2} dz \int_{z_1}^{z_2} dz' \cdot \exp\left(\frac{i2\pi}{\lambda}(A_{m,m}-A_{n,n})(z'-z)\right)$$

$$\exp\left(\int_{z}^{z'}\frac{i2\pi}{\lambda}(B_{m,m}-B_{n,n})\right), n \neq m$$

9. Results For Stationary Random Bend Processes

The unperturbed mismatch between cores can be written as $$\Delta n_{m,n}^{eff} = A_{m,m} - A_{n,n}$$

or as a propagation-constant mismatch.

$$\Delta\beta_{m,n} = \frac{2\pi}{\lambda}(A_{m,m}-A_{n,n}).$$

Off-diagonal transfer matrix elements then start to resemble Fourier transforms:

$$U_{n,m}(z_2,z_1) \approx \frac{i2\pi}{\lambda}C_{nm}\int_{z_1}^{z_2} dz \exp(i\Delta\beta_{m,n}(z-z_1))\exp\left(\int_{z_1}^{z}\frac{i2\pi}{\lambda}(B_{m,m}-B_{n,n})\right),$$

$$n \neq m$$

Now assume that $$f(z) \equiv \exp\left(\int_{z_1}^{z}\frac{i2\pi}{\lambda}(B_{m,m}-B_{n,n})\right)$$

is a stationary random process with correlation length smaller than $|z_2-z_1|$. Then, $$\langle|U_{n,m}|^2\rangle \approx \left|\frac{2\pi C_{nm}}{\lambda}\right|^2 \quad \text{(Eq. 9.7)}$$

$$\int_{z_1}^{z_2} dz \int_{z_1}^{z_2} dz' \exp(i\Delta\beta_{m,n}(z'-z))\langle f(z')f^*(z)\rangle, n \neq m,$$

$$\langle|U_{n,m}|^2\rangle \approx \left|\frac{2\pi C_{nm}}{\lambda}\right|^2$$

$$\int_{z_1}^{z_2} dz \int_{z_1}^{z_2} dz' \exp(i\Delta\beta_{m,n}(z'-z))R_{ff}(z'-z)$$

$$\langle|U_{n,m}|^2\rangle \approx \left|\frac{2\pi C_{nm}}{\lambda}\right|^2 (z_2-z_1)S_{ff}(\Delta\beta_{m,n})$$

Here, $R_{ff}$ is the autocorrelation function of the random process f, and $S_{ff}$ is its power spectral density (PSD). This dictates a method for fabricating and deploying multicore fibers: select the fiber design, spin function, and bend statistics such that the above expression for the crosstalk in an interval $[z_1,z_2]$ is either small, if low crosstalk is desired, or large, if high crosstalk is desired. It can also be optimized so that the different elements corresponding to fiber pairs m,n are as close as possible, if this is desirable.

Considering designs for low crosstalk, for example, it is possible to assume that the preform design is already constrained (so that $C_{m,n}$ and $\Delta\beta_{m,n}$ are fixed) and that the bend profile $R_{bend}(z)$ statistics are determined by cabling and installation conditions. The spin profiles $\theta(z)$ can then be designed to minimize $S_{ff}(\Delta\beta_{m,n})$, as follows:

$$S_{ff}(\Delta\beta) \approx \int d\zeta \exp(i\Delta\beta\zeta)\langle f(z+\zeta)f^*(z)\rangle$$

These results also suggest methods of characterizing a fabricated fiber to determine its crosstalk characteristics: particular pairs of cores will tend to have higher crosstalk than others, across a range of deployment conditions, because these cores are closer to phase-matching. These cores can be identified at the time of fabrication, and cores can be selected for use based on their particular crosstalk. Eq. (9.7) can be used to design a test set of bend conditions that allow estimation of crosstalk in actual deployment conditions.

In the case of regular multicore fibers, nearest-neighbors all have the same spacing a, and so for nearest neighbor cores n,m with displacement angle $\theta_{m,n}$, $$f(z) \equiv \exp\left(\int_{z_1}^{z} \frac{i2\pi}{\lambda} \frac{\gamma n_{core}}{R_{bend}} a\cos(\theta - \theta_{m,n})\right)$$

Since we assumed f is stationary, its autocorrelation function and PSD are the same for all nearest-neighbor pairs in a regular multicore fiber.

This derivation relies on choosing the interval $\Delta z = z_2 - z_1$ to satisfy three approximations:
1. $\Delta z \gg$ correlation length of f,
2. $\Delta z$ is small enough that multiple coupling events can be neglected within the interval, and
3. $\Delta z \ll$ length scale of variation in A and C.

It is believed that the approximations will give useful trends even if not all three conditions can be met rigorously, for example, if multiple coupling events are not quite negligible within the correlation length of f.

10. General Technique

Figure 12:
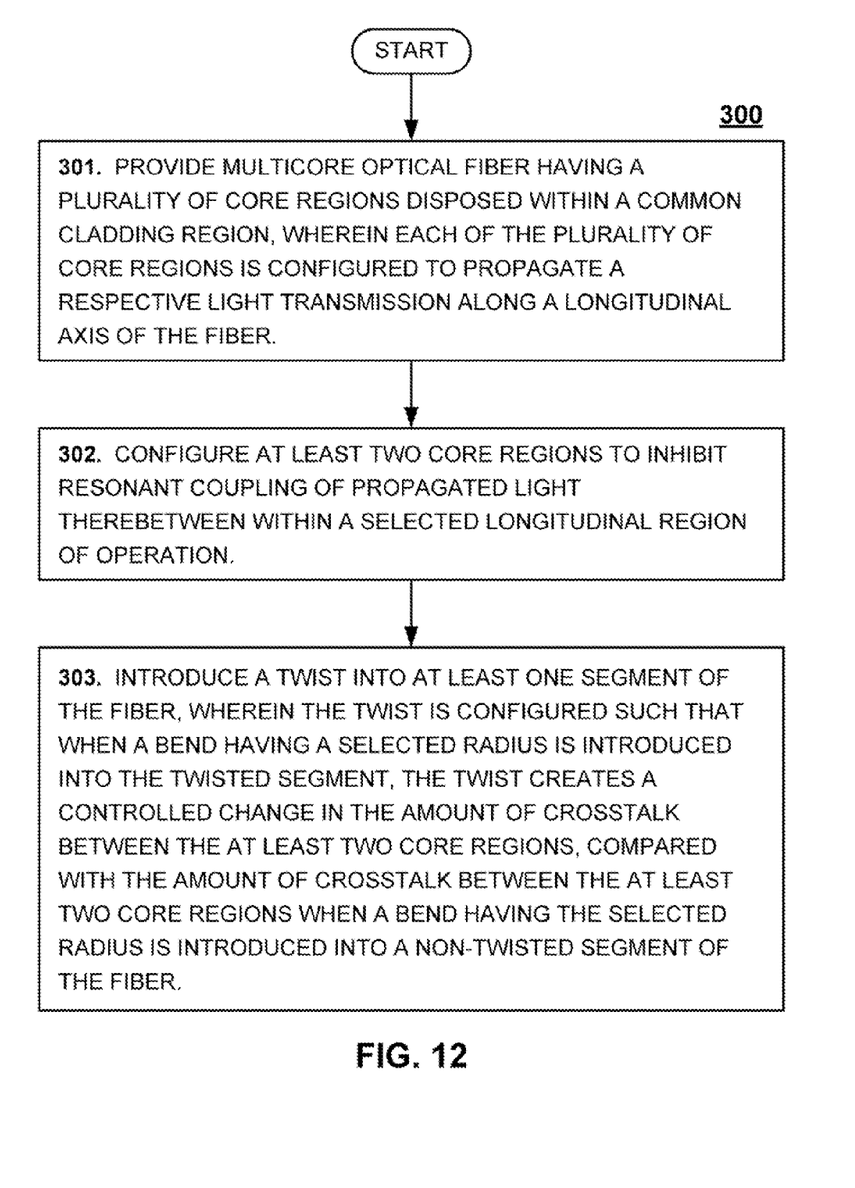
FIG. 12 shows a flowchart of a general technique according to a further aspect of the invention.

FIG. 12 shows a flowchart of a general technique 300 according to various aspects of the invention described herein. Technique 300 comprises the following elements:

Box 301: Provide a multicore optical fiber having a plurality of core regions disposed within a common cladding region, wherein each of the plurality of core regions is configured to propagate a respective light transmission along a longitudinal axis of the fiber.

Box 302: Configure at least two core regions to inhibit resonant coupling of propagated light therebetween within a selected longitudinal region of operation.

Box 303: Introduce a twist into at least one segment of the fiber, wherein the twist is configured such that when a bend having a selected radius is introduced into the twisted segment, the twist creates a controlled change in the amount of crosstalk between the at least two core regions, compared with the amount of crosstalk between the at least two core regions when a bend having the selected radius is introduced into a non-twisted segment of the fiber.

11. Applicability of described techniques to single-mode cores, Multimode cores or a combination thereof It will be appreciated the techniques described above are applicable to different types of multicore fibers. The techniques have been described above in the context of a multicore fiber comprising a plurality of single-mode cores. The techniques may also be applied in the context of a multicore fiber comprising a plurality of multimode cores, a multicore fiber comprising a combination of single-mode and multimode cores, or any other type of multicore fiber in which it is possible to manipulate the amount of crosstalk by increasing or reducing the occurrence of effective mode index matching.

12. Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A multicore optical fiber, comprising:
a plurality of core regions disposed within a common cladding region, wherein each of the plurality of core regions is configured, in combination with the common cladding region, to propagate light along a longitudinal axis of the fiber,
wherein at least two core regions are configured to inhibit resonant coupling of propagated light therebetween within a selected longitudinal region of operation,
wherein at least one segment of the longitudinal region includes a twist that is configured such that when the twisted segment is subjected to a bend having a selected radius, the twist creates a controlled change in the amount of crosstalk between the at least two core regions, compared with the amount of crosstalk between the at least two core regions when a bend having the selected radius is introduced into a non-twisted segment of the fiber,
wherein the twist has a configuration based on the relationship $$\langle |U_{n,m}|^2 \rangle \approx \left| \frac{2\pi C_{nm}}{\lambda} \right|^2 (z_2 - z_1) S_{ff}(\Delta \beta_{m,n})$$

where
U represents a matrix of unperturbed mismatch values,
C represents resonant coupling,
$\lambda$ is wavelength,
$z_2 - z_1$ represents a fiber interval, and
$S_{ff}$ represents power spectral density of an autocorrelation function $R_{ff}$ of a random process f.

2. A method for making a multicore optical fiber, comprising:
(a) providing a multicore optical fiber having a plurality of core regions disposed within a common cladding region, wherein each of the plurality of core regions is configured, in combination with the common cladding region, to propagate light along a longitudinal axis of the fiber;
(b) configuring at least two core regions to inhibit resonant coupling of propagated light therebetween within a selected longitudinal region of operation;
(c) introducing a twist into at least one segment of the fiber within the longitudinal region, wherein the twist is configured such that when a bend having a selected radius is introduced into the twisted segment, the twist creates a controlled change in the amount of crosstalk between the at least two core regions, compared with the amount of crosstalk between the at feast two core regions when a bend having the selected radius is introduced into a non-twisted segment of the fiber,
wherein step (c) includes fabricating the multicore fiber using a draw process in which a spinning technique is used to apply a spin profile to the drawn fiber,
and wherein step (c) further includes:
constructing a spin profile based on the relationship $$\langle |U_{n,m}|^2 \rangle \approx \left| \frac{2\pi C_{nm}}{\lambda} \right|^2 (z_2 - z_1) S_{ff}(\Delta \beta_{m,n})$$

where
U is a matrix of unperturbed mismatch values,
C is coupling
$z_2 - z_1$ is a fiber interval, and
$S_{ff}$ is power spectral density of an autocorrelation function $R_{ff}$ of a random process f.

3. The multicore optical fiber of claim 1, wherein the twist is configured to reduce the amount of crosstalk between the at least two core regions within the region of operation.

4. The multicore optical fiber of claim 1, wherein the twist is configured to increase the amount of crosstalk between the at least two core regions within the region of operation.

5. The multicore optical fiber claim 1, wherein the at least two core regions are configured such that there is a sufficient amount of skew therebetween to reduce resonant coupling in the region of operation in an unbent segment of the fiber, compared with the amount of resonant coupling in an unbent segment of an unskewed fiber.

6. The method of claim 2, wherein the twist is configured to reduce the amount of crosstalk between the at least two core regions within the region of operation.

7. The multicore optical fiber of claim 2, wherein the twist is configured to increase the amount of crosstalk between the at least two core regions within the region of operation.

8. The multicore optical fiber claim 2, wherein the at least two core regions are configured such that there is a sufficient amount of skew therebetween to reduce resonant coupling in the region of operation in an unbent segment of the fiber, compared with the amount of resonant coupling, in an unbent segment of an unskewed fiber.

\* \* \* \* \*